United States Patent [19]

Weigand et al.

[11] Patent Number: 5,802,076
[45] Date of Patent: Sep. 1, 1998

[54] AUDIO ERROR MITIGATION TECHNIQUE FOR A TDMA COMMUNICATION SYSTEM

[75] Inventors: David L. Weigand, Sunnyvale, Calif.; Charles J. Malek, Crystal Lake, Ill.; Gerard G. Socci, Palo Alto, Calif.; Fatih Unal, Sunnyvale, Calif.; S. Dilip, San Jose, Calif.

[73] Assignee: National Semiconductor Corporation, Santa Clara, Calif.

[21] Appl. No.: 653,531

[22] Filed: May 24, 1996

[51] Int. Cl.$^6$ .................................................. H04L 1/20
[52] U.S. Cl. ........................................ 371/31; 375/346
[58] Field of Search ............................... 371/31; 375/346

[56] References Cited

U.S. PATENT DOCUMENTS 5,432,778  7/1995  Minde et al. ................. 370/95.3
5,502,713  3/1996  Lagerqvist et al. ............. 370/17
5,557,639  9/1996  Heikkila ..................... 375/224

*Primary Examiner*—Stephen M. Baker
*Attorney, Agent, or Firm*—Skjerven, Morrill, MacPherson, Franklin & Friel; Brian D. Ogonowsky

[57] ABSTRACT

An audio error mitigation technique for a TDMA communication system is disclosed. An audio error is assumed if any one of the following criteria is met: a detection of a CRC error in the control data or audio data within a slot; the received signal strength is below a certain threshold; or, the detection of an invalid code word, such as an all zero nibble. If either of the criteria is met, and the slot contains audio data, an error mitigation routine is performed. In one embodiment, the error mitigation routine replaces the faulty burst with the previous non-faulty burst. In another mitigation routine, any dv/dt spikes in the faulty burst are detected and smoothed by averaging nearby samples. In one embodiment, both mitigation routines are selectable in the TDMA system.

15 Claims, 4 Drawing Sheets

AUDIO ERROR MITIGATION TECHNIQUE FOR A TDMA COMMUNICATION SYSTEM

CROSS-REFERENCE TO RELATED APPLICATIONS

This application is related to U.S. application Ser. No. 08/621,266, filed on Mar. 21, 1996, entitled "Multi-Tasking Sequencer For a TDMA Burst Mode Controller." This application is also related to U.S. application Ser. No. 08/655,576, filed herewith, entitled "Seamless Handover in a Cordless TDMA System," and to U.S. application Ser. No. 08/655,576, filed herewith, entitled "Inter-Base Synchronization Technique for a TDMA System." The above applications are assigned to the present assignee and incorporated herein by reference.

FIELD OF THE INVENTION

This invention relates to time division multiple access (TDMA) communication systems and, in particular, to a technique for mitigating audio data errors while communicating in the TDMA system.

BACKGROUND

In a TDMA communication system, a number of transmitters can transmit on the same frequency channel, but at different times. A remote receiver for receiving a particular transmitted signal knows beforehand at what time the transmitted signal will occur and receives only during that time. The use of TDMA makes very efficient use of the frequency spectrum since multiple users may use the same frequency channel at the same time without interfering with one another.

FIG. 1 illustrates one type of TDMA system where handheld wireless telephones 10 and 11 share a same frequency channel while transmitting to and receiving from a nearby higher power base station 12. All communications made by telephones 10 and 11 are routed through base station 12 as long as telephones 10 and 11 are in the vicinity of base station 12. The various base stations in the TDMA system are connected to the public telephone lines (not shown).

Additional wireless telephones 13 and 14 are also shown in FIG. 1. Telephone 13 routes its communications through its closest base station 15, and telephone 14 routes its communications through its closest base station 16. The various base stations 12, 15, and 16 convert the received TDMA signals from the handheld telephones 10, 11, 13 and 14 to conventional analog POTS, BRI, or PRI signals for transmission over the telephone lines. Similarly, the base stations 12, 15, and 16 convert the received information on the telephone lines to TDMA signals for transmission to the handheld telephones 10, 11, 13, and 14. Thus, all of the handheld telephones 10, 11, 13 and 14 can communicate with another telephone inside or outside of the TDMA system.

The base stations 12, 15, and 16 receive or transmit time-division multiplexed signals simultaneously. To avoid co-channel interference between telephones using neighboring base stations, neighboring base stations generally operate on different frequency channels, where the frequency channel is automatically selected to minimize co-channel interference. Such a TDMA system may be the Personal Handy Phone System, common in Japan, whose requirements are described in the RCR Standard-28, incorporated herein by reference. As an alternate embodiment, such a TDMA system may be the European ETSI DECT standard, also incorporated herein by reference. Another such alternate embodiment may be the North American PACS standard. Further, slow frequency hopping systems, compliant with CFR Title 47, part 15, and intended for the U.S. ISM-bands, may be derived from the aforementioned formal standards. The operation of such TDMA systems are well known.

In a TDMA system, each wireless telephone 10, 11, 13, and 14, when active, is allocated certain time slots within which it may transmit a bursted signal or receive a bursted signal. FIG. 2 illustrates a frame 17 containing slots 0 through 7, where frame 17 is repeated on a single frequency channel. Other TDMA systems may use 24, 32, or other number of slots in a frame. The period of frame 17 may be, for example, 5 milliseconds. Assuming wireless telephones 10 and 11 in FIG. 1 are being actively used at the same time, telephones 10 and 11 may be allocated slots 0 and 1, respectively, for transmitting bursted signals to base station 12, while allocated slots 4 and 5, respectively, for receiving bursted signals from base station 12. Two additional telephones (e.g., 13 and 14) entering the vicinity of base station 12 may use the available slots 2, 3, 6, and 7 in a similar manner. The amount of information stored in each telephone 10, 11, 13, and 14 during a frame period is transmitted in a burst within a single slot.

A sample protocol 18 for a slot is also shown in FIG. 2, where protocol 18 dictates the information required to be transmitted during a single slot. Protocol 18 may consist of a ramp-up field 20, a start symbol field 21, a clock recovery field 22, a slot sync (or Unique Word) field 23, a data field 24, a CRC field 25 (for error correction and verification), and a guard band field 26. The lengths and types of fields in a protocol vary depending on the mode of the transceiver (e.g., registration mode, paging mode, call set up mode, transmit/receive mode, etc.). While in the traffic mode, where voice is to be transmitted, data field 24 contains audio data. Data field 24 is referred to as the traffic channel or TCH.

In one embodiment, the bit rate of the transmitted bits in a frame 17 is approximately 384K bits per second, and the modulation technique is $\pi/4$DQPSK. Therefore, the corresponding symbol rate is 192K symbols per second.

An error in the audio data field received by a handset manifests itself as a click noise made by the handset's speaker. It is known to suppress this click noise by detecting the large dv/dt excursion in the reconstructed waveform and replacing the erroneous sample with an average of the value of the previous sample and the next sample. However, this prior art mitigation technique is prone to falsing on ordinary speech (e.g., when the large dv/dt excursion was intended to be communicated). The CRC field is intended to identify errors in the speech data but in, for example, the DECT standard the CRC polynomial is weak ($G(x)=x^4+1$) and is also subject to falsing (i.e., not detecting an error when there are fields of multiple errors due to error cancellation in the parity field of the code word). Additionally, a fade of the signal strength may also cause the CRC error detection to fail.

What is needed is a technique for mitigating audio data errors which is less subject to falsing.

SUMMARY

An audio error mitigation technique for a TDMA communication system is disclosed. The TDMA system transmits data in bursts during slot times. An audio error is assumed if any one of the following criteria is met: a detection of a CRC error in the control data or audio data within a slot; the received signal strength is below a certain threshold; or, the detection of an invalid code word, such as an all zero nibble. If either of the criteria is met, and the slot contains audio data, an error mitigation routine is performed. In one embodiment, the error mitigation routine replaces the faulty burst with the previous non-faulty burst. In another mitigation routine, any dv/dt spikes in the faulty burst are detected and smoothed by averaging nearby samples. In one embodiment, both mitigation routines are selectable in the TDMA system.

DETAILED DESCRIPTION OF THE PREFERRED EMBODIMENTS

Overview of TDMA Controller

Figure 1:
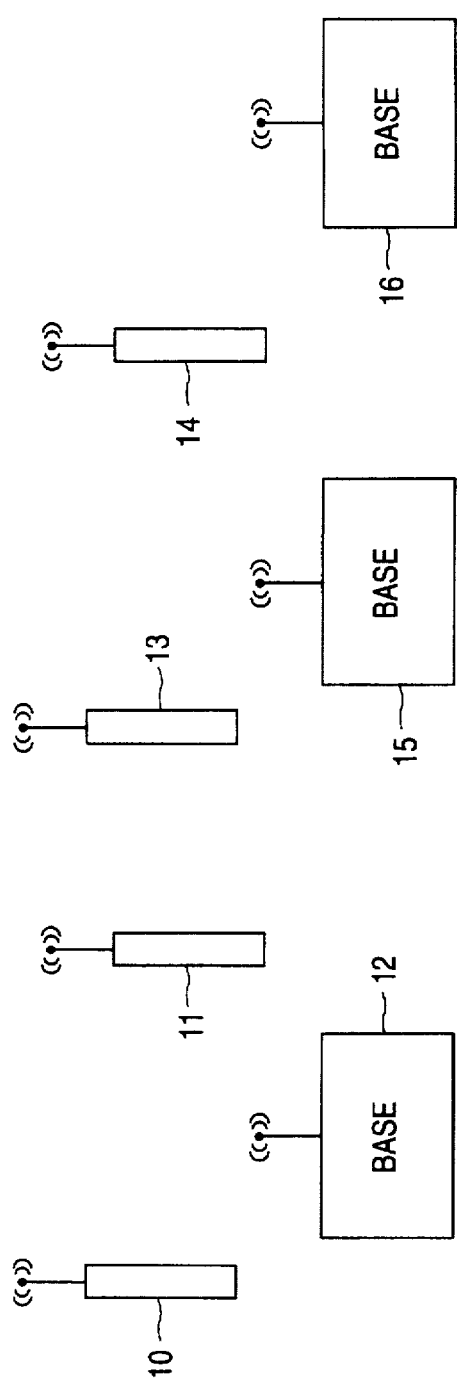
FIG. 1 illustrates a prior art TDMA system consisting of stationary base stations and portable telephone transceivers.
Figure 3:
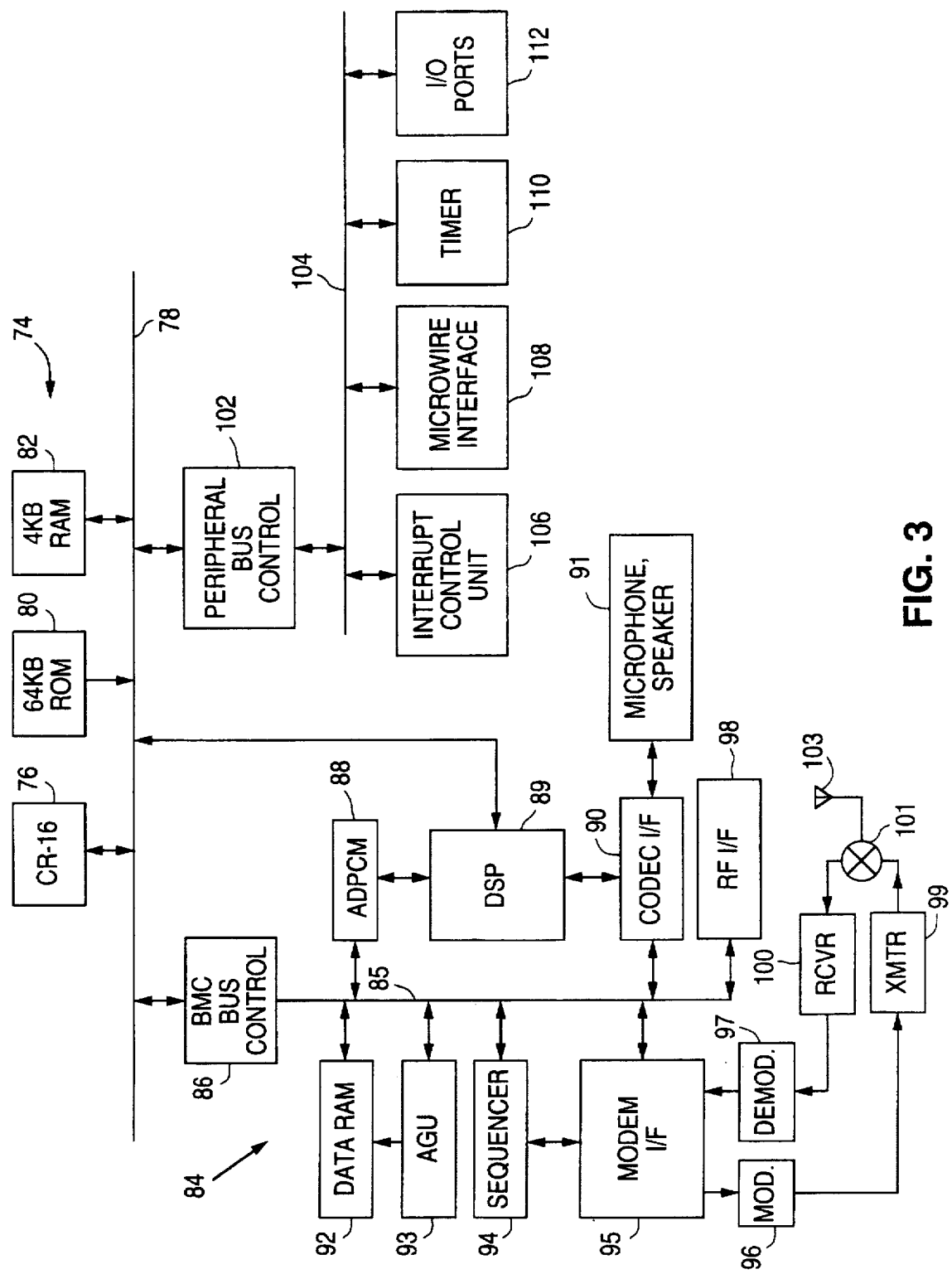
FIG. 3 illustrates the basic architecture of the preferred embodiment TDMA system transceiver.

FIG. 3 illustrates the preferred embodiment TDMA controller architecture incorporating certain novel features. This architecture may be used in a TDMA system such as shown in FIG. 1. The controller of FIG. 3 is the same for the base stations and the handheld wireless telephones in the TDMA system. The TDMA controller 74 includes a microprocessor 76, such as a model CR-16 from National Semiconductor Corporation, for high level control over the TDMA controller functions. The Microprocessor 76 is connected to a system bus 78 along with a program ROM 80 and static RAM 82. RAM 82 is used for storing information for various purposes, such as storing program variables, mailbox information, and stack parameters.

A burst mode controller (BMC) 84 for creating the slots for transmission at precise times is also connected to system bus 78 and consists of a number of components. A BMC bus 85 is connected to system bus 78 via a BMC bus controller 86, whose general function would be understood by those skilled in the art.

An adaptive differential pulse code modulation (ADPCM) voice coder 88 provides encoding and decoding of audio information. A digital signal processor 89 interacts with voice coder 88 and an interface unit 90 to generate the audio information bits to be transmitted.

A microphone and speaker 91 in the telephone handset are connected to interface unit 90. In the base station, interface unit 90 is connected to the land-line network connection.

A slot opcode data RAM 92 contains certain protocol bits, address bits, and data bits which will be called upon during operation of the TDMA controller to build a slot for transmission or to store a received slot. An address generation unit (AGU) 93 addresses the information in RAM 92 under the control of a sequencer 94. Sequencer 94 is the device that controls assembling the slots for transmission, and disassembling the slots after reception, at synchronized times by outputting control flow sequences to the modem interface unit 95.

Modem interface unit 95 receives control signals from sequencer 94 and, in response, retrieves the bits from various sources, such as data RAM 92, for building the serial bit stream in a slot. Modem interface unit 95 also distributes the bits in a received slot to the appropriate destinations for further processing by the microprocessor and the ADPCM engine.

Figure 2:
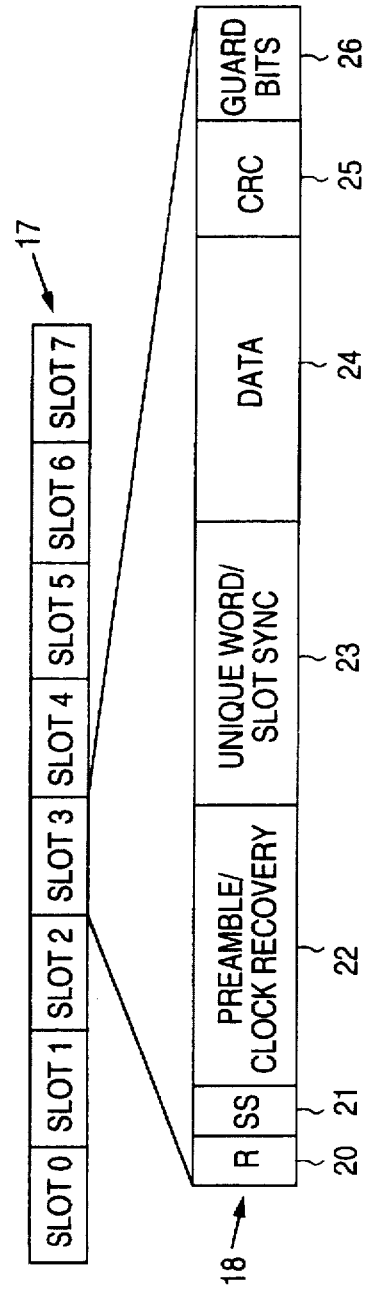
FIG. 2 illustrates a single frame containing slots which are transmitted/received on a single frequency channel in a conventional TDMA system.

The serial bit stream for transmission by transmitter 99 is sent to a modulator 96, while a demodulator 97 sends a received bit stream from receiver 100 to modem interface unit 95 for processing. The demodulator 97 also contains modules for performing clock and slot synchronizing (using the Unique Word field 23 and the Preamble in FIG. 2), whereby matching synchronization/clock codes cause demodulator 97 to issue synchronization signals to sequencer 94. Encryption/decryption circuitry may be connected to the modulator 96 and demodulator 97.

An RF interface 98 circuit is also included. The RF interface 98 circuit is typically comprised of an additional microwire interface intended to load a PLL synthesizer(s) in the RF deck and also provides control signals to the RF deck, such as various transmit/receive, power down, antenna steering, or Received Signal Strength Indicator (RSSI) capture signals.

A transmit/receive switch 101 and antenna 103 are also shown.

The peripheral devices and their controllers are also connected to system bus 78. Such devices, include, for example, a peripheral bus control 102 for coordinating access between the system bus 78 and the peripheral bus 104, an interrupt control unit 106, a microwire interface 108 for interfacing with, for example, a digital answering machine, a timer 110, and the various input/output ports 112 which are connected to, among other things, a transmitter and receiver portion of the transceiver.

Since this disclosure primarily deals with the operation and construction of certain novel circuits and architecture within the TDMA system, the remaining hardware may be conventional or slightly modified in view of the novel circuits and architectures.

As previously mentioned, the operation of sequencer 94 in the TDMA controller is to issue precisely bit-timed multiple control flow signals to the modem interface unit 95 in order to assemble or disassemble the slots within a frame and ensure the bits within the slots are synchronized with the base station transceiver.

Audio data in ADPCM coding from a received slot is converted from a serial stream to bytes and stored in data RAM 92 using a receive (or slot) pointer. This ADPCM data is then addressed, using an ADPCM pointer, and routed to the ADPCM engine 88 (FIG. 3) for decoding and processing during the frame period.

Description of Error Mitigation Technique

Figure 4:
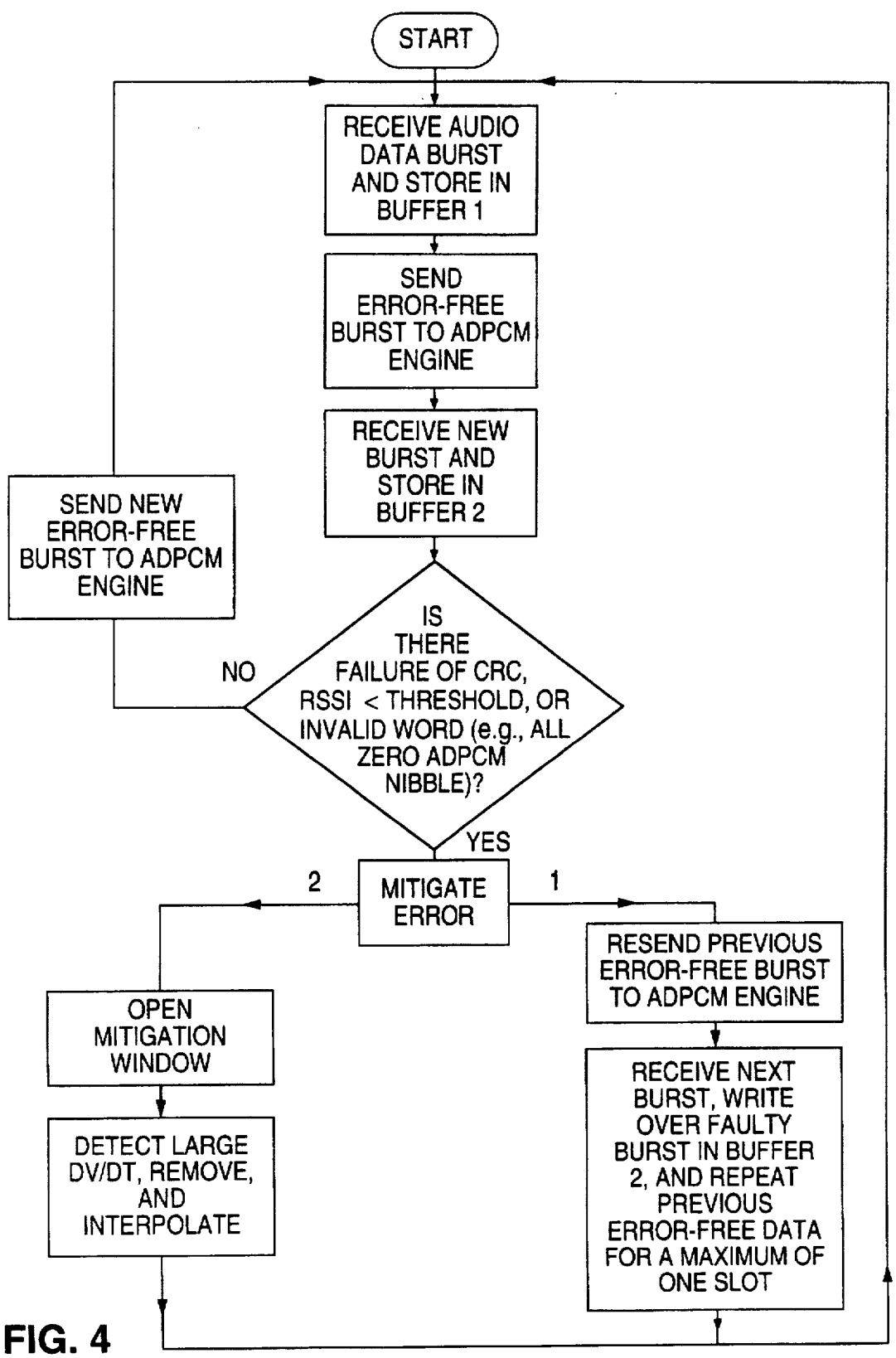
FIG. 4 is a flowchart for an audio error mitigation process.

In the preferred embodiment TDMA controller, a novel audio error indicator is used, as indicated in the flow chart of FIG. 4, which reduces the likelihood of falsing. If the data is not audio, the detection of an error will simply cause the data to be retransmitted after a delay. Such a retransmission is not a viable alternative when transmitting audio data to be listened to in real time. Control bits in the frame during the channel set up indicate whether the data in the information field will be audio or non-audio data, as is well known in the art.

In the first step, an audio data burst in a slot is received and stored in a first buffer. Assuming the first burst was error-free, a new burst is received and stored in a second buffer. Next, for the new burst, it is determined whether either of the following criteria is met: a failure of the Cyclic Redundancy Check (CRC) codes to match, the Received Signal Strength Indicator (RSSI) is below a threshold, or the reception of an invalid word, such as an all 0 nibble, which is not defined by the G.721 vocoder algorithm. Control data and audio data typically exist in the information field of a slot. The control data provides information such as the base station identification. In certain TDMA systems, there is a CRC error code for the control data (called A-CRC) and a CRC error code for the audio data (called X-CRC) within a slot. If either the A-CRC or X-CRC codes fail to match, then there is an assumed to be an audio error.

The RSSI threshold is system dependent and will be a carrier/interference (C/I) signal ratio which gives rise to an objectional error rate for the system.

Upon detection of any one of the criteria not being met, a mitigation subroutine is initiated. Two different mitigation routines are shown in FIG. 4. One or the other or both may be performed by the TDMA system. The mitigation routine 1 is the simplest and least processing intensive. The mitigation routine 2, however, results in less detectable audio error mitigation.

Figure 5:
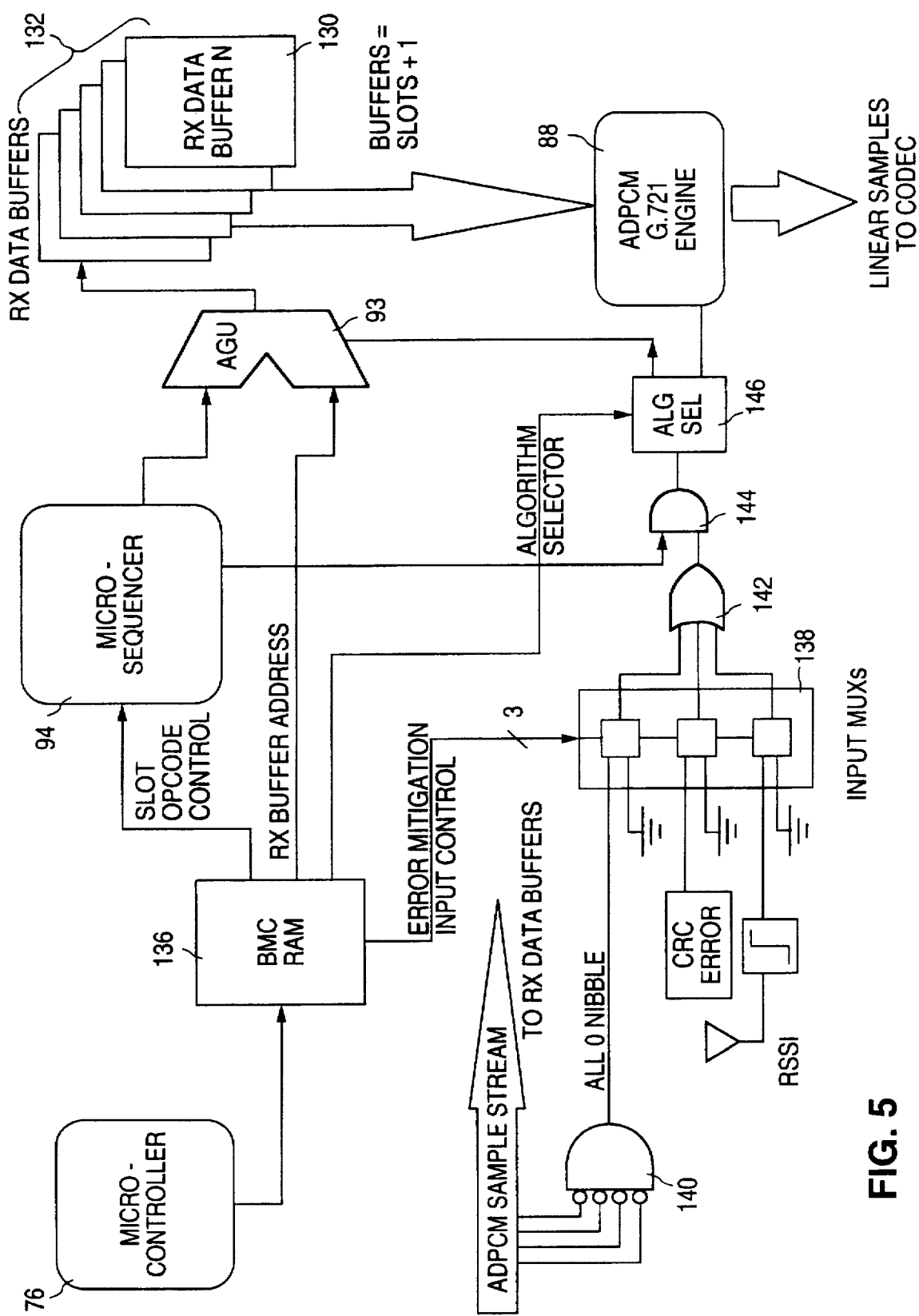
FIG. 5 illustrates a circuit for performing audio error mitigation.

Assuming the mitigation routine 1 is used, the faulty burst will be overwritten by the next received burst. This is accomplished by using a double buffer architecture which stores two consecutive bursts. This is illustrated in FIG. 5 where one extra buffer 130 is provided as a receive buffer. Thus, there will be one more receive buffer 132 than the number of receive slots in the preferred embodiment. To write over the faulty burst in a buffer, the receive buffer pointer, which loads the received data into the buffer, will not be incremented after storing the faulty burst. Consequently, the next burst writes over the faulty burst in the buffer.

Because the faulty burst is overwritten, the faulty burst will not be decoded by the ADPCM engine 88 (FIG. 5). Instead, the previous good burst in another buffer is, up to one time, again addressed by the ADPCM pointer and sent to the ADPCM 88 engine.

Alternatively, using the second mitigation routine, only the faulty portion of the burst is suppressed by averaging nearby samples, rather than writing over the entire faulty burst. In this mitigation routine, once it is determined that one of the above-mentioned criteria is met, a mitigation window is opened for that slot. Any large dv/dt spike, evidencing an audio error manifested as a click noise, is detected and deleted. The deleted data is substituted by interpolated data obtained by averaging nearby samples. By not always deleting large dv/dt spikes, as in the prior art, intentional impulse-like sounds are not inadvertently deleted.

FIG. 5 is a simplified diagram of the pertinent portions of the TDMA system which are used in the preferred audio error mitigation technique. Elements identified with the same numerals as those elements in FIG. 3 are identical.

A microcontroller 76, or microprocessor, provides the overall control of the TDMA system and loads slot operation codes (op codes) into a Burst Mode Controller (BMC) RAM 136. There is an opcode associated with each slot which is addressed and sent to the microsequencer 94 at the appropriate slot time. If the previously described criteria for a faulty slot is met, the op code will command the microsequencer 94, incorporating a microcode ROM or RAM, to perform an audio error mitigation routine.

The BMC RAM 136 will enable the input multiplexers 138, which will provide a logical 1 output if either: an all zero nibble (or any invalid word), a CRC error, or a low RSSI is detected. An AND gate 140, having as inputs inverted ADPCM nibbles, outputs a logical 1 upon receiving an all 0 nibble. An OR gate 142 is connected between the input multiplexer 138 and AND gate 144. The other input into AND gate 144 is a synchronized enable signal from the microsequencer 94.

Optionally, an algorithm selector 146 is provided which selects between the two mitigation techniques described above. If the first mitigation technique is selected, the AGU 93 is selectively controlled to address the appropriate receive buffer 132, as previously described, so that the faulty data is written over by the next burst and the previous good data is applied to the ADPCM engine 88 for two consecutive slot times. If the second mitigation technique is selected, the dv/dt spike is deleted and replaced with interpolated data.

Conclusion

This disclosure primarily focuses on those non-conventional features of a TDMA controller. Those circuits typically used in TDMA controllers which have not been described in detail may generally be conventional circuits using conventional algorithms. For example, the circuits and algorithms for detecting CRC errors and RSSI levels may be conventional. The concepts described herein may be applied to any TDMA controller. While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. An audio error mitigation method for a TDMA communication system, said system transmitting and receiving bursts of data within slot times, said method comprising the steps of:

receiving a burst of data containing audio data within a slot time in said TDMA system;

detecting whether any one of the following criteria is met for said burst: a Cyclic Redundancy Check (CRC) error, a received signal strength below a threshold level, or an invalid code word in said burst; and upon detection that any one of said criteria is met, performing an audio mitigation routine on said burst.

2. The method of claim 1 wherein said audio mitigation routine detects a voltage spike in said burst and smooths said spike.

3. The method of claim 1 wherein said audio mitigation routine replaces said burst with a previous burst having no detected audio errors.

4. The method of claim 1 wherein said invalid code word comprises an all zero code word.

5. The method of claim 1 wherein said received signal strength threshold is a carrier/interference signal ratio which gives rise to an objectional error rate for said TDMA system.

6. The method of claim 1 wherein said CRC error comprises an error in any CRC codes within said burst.

7. The method of claim 6 wherein said burst contains a CRC code for audio data within said burst and a CRC code for non-audio data within said burst, and said CRC error comprises an error in either one of said CRC codes.

8. A device for use in a TDMA system for mitigating audio errors in a burst comprising:

a means for detecting an audio data error in said burst comprising:

a first means for detecting a Cyclic Redundancy Check (CRC) error in said burst;

a second means for detecting whether a received signal strength is below a specified threshold during said burst;

a third means for detecting the presence of an invalid word in said burst; and a fourth means for detecting an output of said first means, second means, and third means and, in response to a detection of any of the above three criteria, issuing a first signal for commencing an audio error mitigation routine; and a means for performing an audio error mitigation routine on said burst in response to said first signal.

9. The device of claim 8 further comprising an adaptive differential pulse code modulator which decodes data within said burst.

10. The device of claim 8 further comprising receive buffers for storing received bursts, wherein consecutive bursts are stored in a first receive buffer and a second receive buffer, and wherein said audio mitigation routine, upon detecting that a burst in said first receive buffer contains an audio error, does not covert audio data in said first receive buffer to analog signals, but instead converts a previous burst in said second receive buffer deemed to contain no audio errors to analog signals so as to repeat any audio content in said previous burst.

11. The device of claim 8 wherein said audio mitigation routine detects a voltage spike in said burst and smooths said spike.

12. The device of claim 8 wherein said invalid code word comprises an all zero code word.

13. The device of claim 8 wherein said CRC error comprises an error in any CRC codes within said burst.

14. The device of claim 8 wherein said burst contains a CRC code for audio data within said burst and a CRC code for non-audio data within said burst, and said CRC error comprises an error in either one of said CRC codes.

15. The device of claim 8 wherein said specified threshold for said received signal strength is a carrier/interference signal ratio which gives rise to an objectionable error rate for said TDMA system.

* * * * *

UNITED STATES PATENT AND TRADEMARK OFFICE
CERTIFICATE OF CORRECTION

PATENT NO. : 5,802,076
DATED : September 1, 1998
INVENTOR(S) : Weigand, David L.; Malek, Charles J.; Socci, Gerard G.; Unal, Fatih; Dilip, S.

It is certified that error appears in the above-identified patent and that said Letters Patent is hereby corrected as shown below:

Col. 1, line 10, delete "08/655,576" insert --08/655,355--.

Signed and Sealed this

Twenty-ninth Day of June, 1999

*Attest:*

Q. TODD DICKINSON

*Attesting Officer*     Acting Commissioner of Patents and Trademarks